(12) United States Patent
Krithivasan et al.

(10) Patent No.: US 7,877,571 B2
(45) Date of Patent: Jan. 25, 2011

(54) SYSTEM AND METHOD OF DETERMINING AN ADDRESS OF AN ELEMENT WITHIN A TABLE

(75) Inventors: Shankar Krithivasan, Austin, TX (US); Lucian Codrescu, Austin, TX (US); Erich James Plondke, Austin, TX (US); Mao Zeng, Austin, TX (US)

(73) Assignee: QUALCOMM, Incorporated, San Diego, CA (US)

( * ) Notice: Subject to any disclaimer, the term of this patent is extended or adjusted under 35 U.S.C. 154(b) by 445 days.

(21) Appl. No.: 11/943,265

(22) Filed: Nov. 20, 2007

(65) Prior Publication Data

US 2009/0132783 A1    May 21, 2009

(51) Int. Cl.
*G06F 12/00* (2006.01)
(52) U.S. Cl. ....................................... 711/202
(58) Field of Classification Search ................ None
See application file for complete search history.

(56) References Cited

U.S. PATENT DOCUMENTS 5,924,128 A * 7/1999 Luick et al. ................. 711/220
6,662,292 B1 * 12/2003 Wilson ........................ 711/220
7,243,210 B2   7/2007 Pedersen et al.
2004/0034758 A1 * 2/2004 Rampogna et al. .......... 711/220

FOREIGN PATENT DOCUMENTS

JP   2007-234065   9/2007
WO   9914665      3/1999

OTHER PUBLICATIONS

International Search Report-PCT/US08/084189, International Search Authority-European Patent Office-Feb. 6, 2009.
Written Opinion-PCT/US08/084189, International Search Authority-European Patent Office-Feb. 6, 2009.

* cited by examiner

*Primary Examiner*—Hiep T Nguyen
(74) *Attorney, Agent, or Firm*—Nicholas J. Pauley; Peter M. Kamarchik; Jonathan T. Velasco (57) ABSTRACT

In a particular embodiment, a method is disclosed that includes executing a single instruction to identify a location within a table stored at a memory. The single instruction is executable by a processor to extract bit field data from a first register and insert the bit field data into an index portion of a second register. The second register includes a table address portion and an index portion. The table address portion includes a table address identifying a memory location associated with a table. The table address and the bit field data combine to form an indexed address to an element within the table.

23 Claims, 6 Drawing Sheets

SYSTEM AND METHOD OF DETERMINING AN ADDRESS OF AN ELEMENT WITHIN A TABLE

I. FIELD

The present disclosure is generally related to a system and method of determining an address of an element within a table.

II. DESCRIPTION OF RELATED ART

Digital signal processors (DSPs) are frequently used in portable personal computing devices, such as wireless telephones, personal computers, personal digital assistants (PDAs), audio players, other electronic devices, or any combination thereof. Such DSPs can be utilized to provide video and audio functions, to process received data, or to perform other functions. Such DSPs can employ multi-threaded architectures, which can process multiple program instruction threads and can include parallel execution units.

A processor, such as a DSP, typically includes a memory address generator that generates memory addresses for retrieving data from a main memory or for storing data produced by the DSP. In some instances, a memory address may be calculated based on retrieved values. After the values are retrieved, an arithmetic and logic unit (ALU) performs a bit shifting operation on the values and the shifted values are stored into the registers. In a next instruction cycle, the shifted values may be read from the registers and a numeric operation can be performed on the shifted values to produce a memory address. The processor can utilize the memory address to access a location within the memory, either to write other results or to retrieve data.

In current processors, it is common to look up data in a table based on some number of bits in a structure. However, calculating an address into a table can require two or more execution cycles. Hence, there is a need for enhanced address calculation.

III. SUMMARY

In a particular embodiment, a method is disclosed that includes executing a single instruction to identify a location within a table stored at a memory. The single instruction is executable by a processor to extract bit field data from a first register and insert the bit field data into an index portion of a second register. The second register includes a table address portion and an index portion. The table address portion includes a table address identifying a memory location associated with a table. The table address and the bit field data combine to form an indexed address to an element within the table.

In another particular embodiment, a processor is disclosed that includes a first register including a bit field and a second register including a table address portion and an index portion. The table address portion includes a table address identifying a location of a table in a memory. The processor also includes an execution unit that is adapted to generate an address by processing a single instruction to extract bit field data from the bit field of the first register and to insert the extracted bit field data into the index portion of the second register to generate an address to an element within the table.

In still another particular embodiment, a method of determining an address into a table is disclosed. The method includes extracting bit field data from a first register and inserting the extracted bit field data into an index portion of a second register including a table address portion and the index portion. The second register includes table address data stored in the table address portion identifying a memory location associated with a table. The table address data and the extracted bit field data provide the memory location and a table index to an element within the table.

One particular advantage provided by embodiments of the system and method disclosed herein is that operations involving a combination of a shift and an arithmetic operation can be performed in a single execution cycle.

Another particular advantage provided by embodiments of the method is provided in that addresses can be calculated quickly and operations that utilize lookup tables can be improved. For example, a DSP that supports the particular method and associated instruction can generate an address within a table using an index and a base address in a reduced number of instruction cycles.

Still another particular advantage is provided in that shift and masking operations, which can be used in cyclic redundancy check and other common DSP operations, can be executed in a single instruction and in a single execution cycle, reducing bus accesses for register read/write operations. Additionally, the number of instructions used to perform the particular operation is reduced.

Yet another advantage is provided in that address calculations are simplified. Another particular advantage is provided in that reducing a number of execution cycles to determine an address enhances processor performance efficiency.

Other aspects, advantages, and features of the present disclosure will become apparent after review of the entire application, including the following sections: Brief Description of the Drawings, Detailed Description, and the Claims.

V. DETAILED DESCRIPTION

Figure 1:
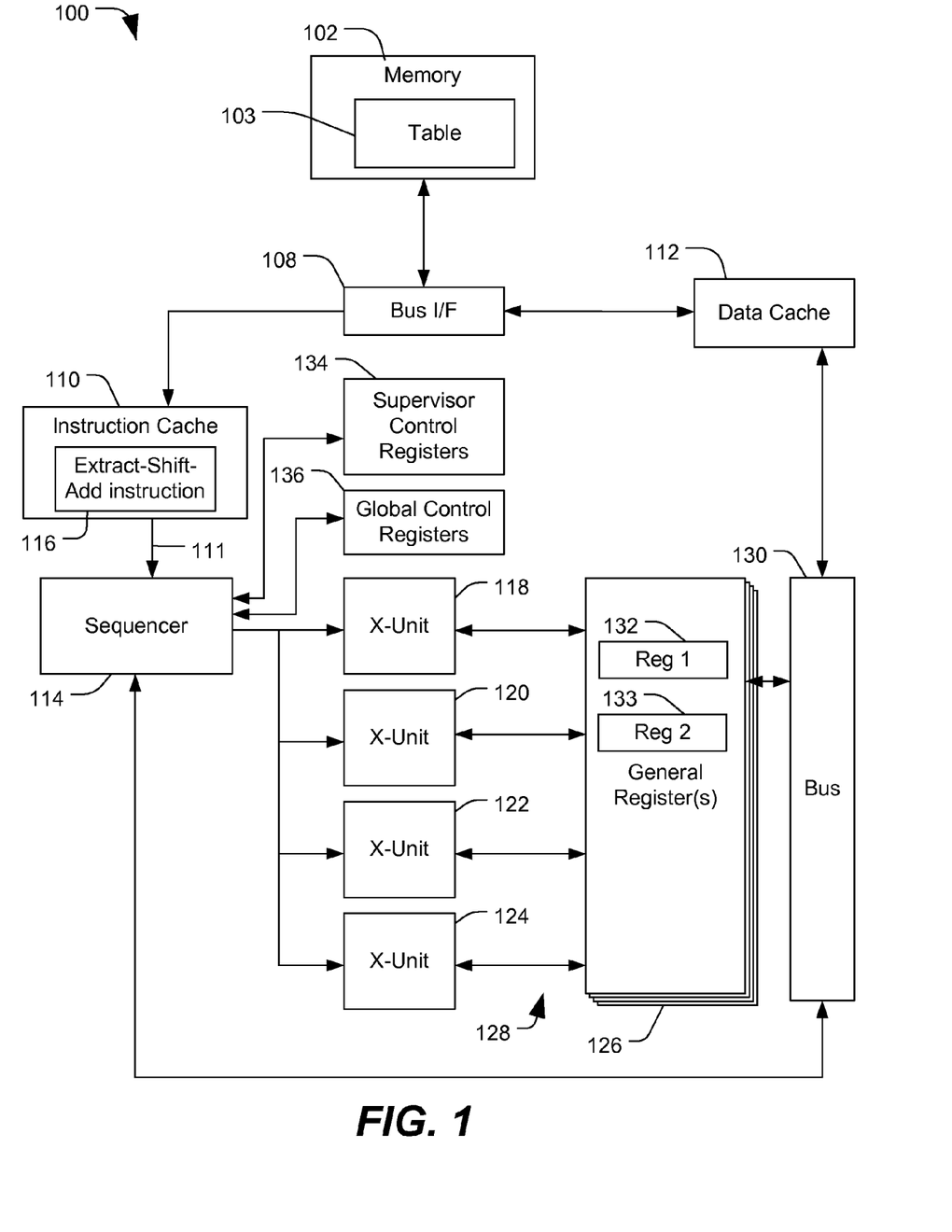
FIG. 1 is a block diagram of a particular illustrative embodiment of a processing system adapted to execute an instruction to determine an address of an element in a table.
Figure 2:
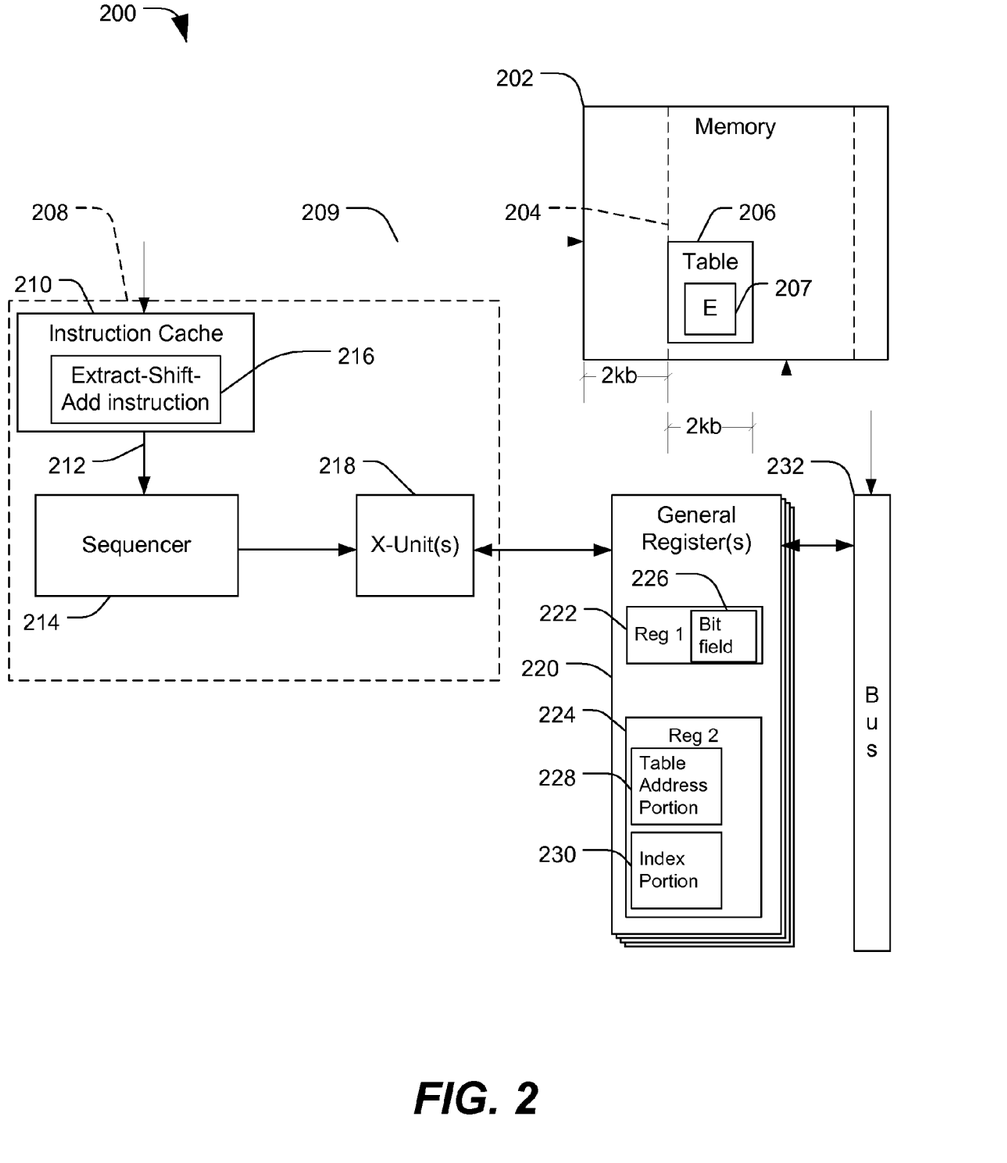
FIG. 2 is a diagram of a second illustrative embodiment of a processing system adapted to execute an instruction to determine an address of an element in a table.

FIG. 1 is a block diagram of a particular illustrative embodiment of a processing system 100 adapted to execute an extract-shift-add instruction 116 to determine an address of an element in a table 103 (such as an element 207 within a table 206 illustrated in FIG. 2). The processing system 100 includes a memory 102 that includes the table 103. The memory 102 is coupled to an instruction cache 110 via a bus interface 108. The processing system 100 also includes a data cache 112 that is coupled to the memory 102 via the bus interface 108. The instruction cache 110 is coupled to a sequencer 114 via a bus 111. In a particular example, the sequencer 114 can also receive general interrupts, which may be retrieved from an interrupt register (not shown). In a particular embodiment, the instruction cache 110 may be coupled to the sequencer 114 via a plurality of current instruction registers, which may be coupled to the bus 111 and associated with particular threads of the processing system 100. In a particular embodiment, the processing system 100 is an interleaved multi-threaded processor including six threads.

In a particular embodiment, the bus 111 is a sixty-four (64)-bit bus and the sequencer 114 is configured to retrieve instructions from the memory 102 via instruction packets that include multiple instructions having a length of thirty-two (32) bits each. The sequencer 114 is coupled to a first instruction execution unit 118, a second instruction execution unit 120, a third instruction execution unit 122, and a fourth instruction execution unit 124. Each instruction execution unit 118, 120, 122, 124 can be coupled to a general register file 126 via a second bus 128. The general register file 126 can also be coupled to the sequencer 114, the data cache 112, and the memory 102 via a third bus 130. In a particular illustrative embodiment, the general register file 126 may include a first register 132 and a second register 133 to store data related to an element within a table.

The processing system 100 may also include supervisor control registers 134 and global control registers 136 to store bits that may be accessed by control logic within the sequencer 114 to determine whether to accept interrupts and to control execution of instructions.

In a particular illustrative embodiment, the execution unit 118 can receive the extract-shift-add instruction 116 from the instruction cache 110 via the sequencer 114. The execution unit 118 can retrieve (extract) bit field data from the first register 132, shift the retrieved bit field data a pre-determined number of bits, and add the shifted bit field data (i.e., insert the retrieved bit field data) to data within the second register 133. In a particular example, the execution unit 118 can retrieve the bit field data from the first register 132, determine an insertion point within the second register 133 and insert the retrieved bit field data at the insertion point within the second register 133. In a particular example, a bit offset may represent whether the table stores bytes, halfwords, words or double-words. The insertion point may be determined based on the data stored in the table, and the retrieved bit field data may be inserted at the insertion point in the second register 133. The second register 133 may store a memory location associated with a table in an address portion and may receive the retrieved bit field data within an index portion of the second register 133. The data stored in the second register 133 after the retrieved bit field data is inserted represents an address of an element within the table. The address of the element within the table may then be used to access the element within the memory 102 at the address specified by the data in the second register 133. In a particular embodiment, the address may be determined in a single instruction or execution cycle. In a particular embodiment, an instruction cycle generally includes multiple stages, including one or more instruction fetch stages, a decode stage, a read register file stage, one or more execution stages, and a write back stage. In general, it should be understood that an instruction cycle represents an instruction execution cycle for a particular instruction at a particular thread.

In a particular embodiment, at least one of the execution units 118, 120, 122, and 124 may include a shifter adapted to shift the extracted bit field data extracted from the first register 132 by a pre-determined number of bits. The shifted bit field data may then be inserted into an index portion of the second register using an add operation. The shifter may be a bi-directional shifter that is adapted to shift bits right or left.

FIG. 2 is a block diagram of a second particular embodiment of a system 200 including a processor that is adapted to execute an instruction to determine an address of an element in a table. The system 200 includes a memory 202 that includes one or more logical memory boundaries, such the memory boundary 204, which defines a two-kilobyte memory space. The memory 202 is adapted to store a table 206 that is aligned to the memory boundary 204. The table 206 is adapted to hold entries of bytes, half words, words, double words, or any combination thereof. The table 206 may include an element (E) 207 that is accessible at a memory location that includes table index information.

In a particular example, the table 206 can be aligned to a logical boundary, such as the boundary 204 within the memory 202. In general, the boundary 204 is a logical boundary having a location that corresponds to a power of two (i.e., $2^N$) boundary that is greater than or equal to a size of the table 206. For example, if the table 206 is a two-kilobyte table, the table 206 may be aligned to a memory boundary 204 at a zero memory boundary that includes a 2 kb contiguous block of memory space, a 2 kb memory boundary having at least a 2 kb contiguous block of memory space, a 4 kb memory boundary, and so on. For example, if the table 206 is a four-kilobyte table, the table 206 can be aligned to a 4 kb logical boundary, such as a zero memory boundary (i.e., memory address zero and sequence) that includes a contiguous four kilobyte block of memory space, a 4 kb boundary, an 8 kb boundary, and so on. The memory boundary may have an available space that is greater than a size of the table 206. In a particular example, by aligning the table 206 to a power of two logical boundary 204 within the memory 202, the memory address of the table 206 may be determined from most significant bits of a register and least significant bits may be utilized as a corresponding index into the table 206, allowing an address calculation to be used to address the element (E) 207 within the table 206, for example.

The memory 202 is adapted to communicate with a processor via a bus 232 that is coupled to general registers 220 and via a bus 209 that is coupled to an instruction cache 210. The processor, generally indicated by phantom line 208, includes the instruction cache 210, which can store an extract-shift-add instruction 216. The instruction cache 210 communicates with a sequencer 214 via a bus 212. The sequencer 214 provides instructions to one or more execution units 218. The one or more execution units 218 communicate with the general registers 220 to retrieve and store data. The general registers 220 include a first register 222 and a second register 224. The first register 222 includes a bit field 226. The second register 224 includes a table address portion 228 and an index portion 230.

In a particular illustrative embodiment, data may be calculated, loaded, or otherwise retrieved and stored in the first and second registers 222 and 224. The sequencer 214 is adapted to retrieve an extract-shift-add instruction 216 from the instruction cache 210 and to provide the extract-shift-add instruction 216 to at least one of the one or more execution units 218. The one or more execution units 218 are adapted to extract data related to the bit field 226 from the first register 222 and to insert the extracted data into the index portion 230 of the second register 224 to form an address to access an element 207 within the table 206 of the memory 202. The address portion 228 of the second register includes a table address. In a particular example, the one or more execution units 218 may calculate the address of the table element 207 within the table 206 in a single execution cycle.

In a particular example, the one or more execution units 218 are adapted to insert the data extracted from the bit field 226 of the first register 222 into the index portion 230 of the second register 224. The index portion 230 of the second register 224 may represent the least significant bits of the second register 224. The table address portion 228 of the second register 224 may represent the most significant bits of the second register 224. In a particular illustrative example, the one or more execution units 218 may be adapted to selectively insert the data extracted from the bit field 226 of the first register 222 at an insertion location within the index portion 230 of the second register 224.

For example, in a particular illustrative embodiment, the one or more execution units 218 may be adapted to select an insertion point within the index portion 230 based on the type of data stored in the table 206. For example, if the table 206 stores bytes of data, the insertion point may be at bit 0 within the index portion 230 of the second register 224. When the table stores half words, the insertion point may at bit 1 of the index portion 230 of the second register 224. When the table 206 stores words of data, the insertion point within the index portion 230 may be at bit 2 within the index portion 230 of the second register 224. When table 206 stores double words of data, the insertion point may be at bit 3 within the index portion 230 of the second register 224. The insertion point can be used to represent an offset value related to the field to be extracted. In a particular illustrative embodiment, the first register 222 may include the bit field 226 which may have both width and offset information. The offset information may be used to determine which insertion location to utilize.

In general, it should be understood that the extract-shift-add instruction 216 is simply a label that is used to describe a particular instruction packet that can be used to calculate an address of a table 206 and an index to an element 207 within the table 206 in a single instruction cycle. However, the instruction may be described using a different label. Additionally, it should be understood that a packet of instructions that includes a table address/index calculation instruction, such as the extract-shift-add instruction 216, may also include other instructions, microinstructions, operations, or any combination thereof. Further, such a packet of instructions may spawn execution of additional operations, microinstructions, instructions, or any combination thereof.

Figure 3:
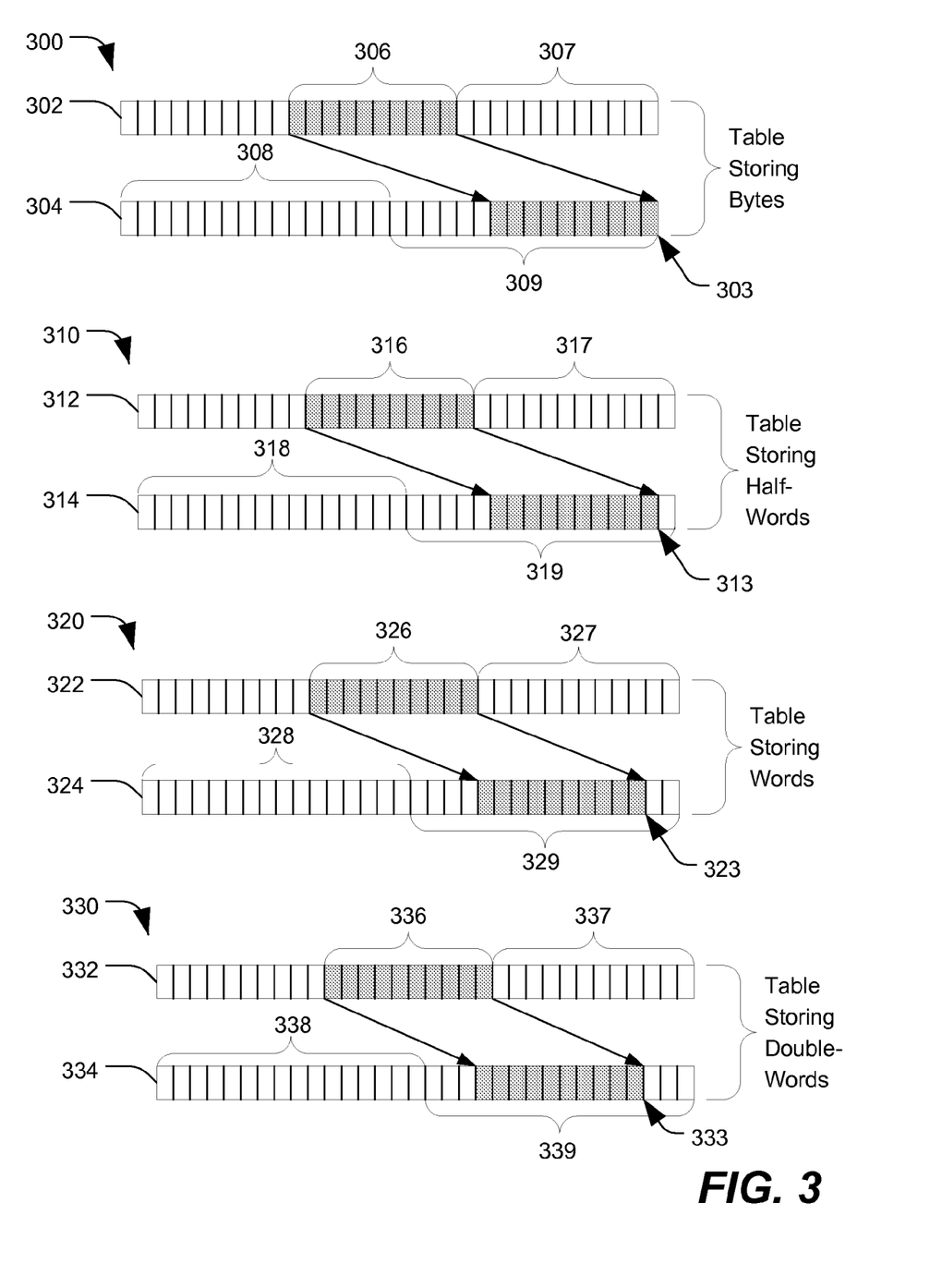
FIG. 3 is a diagram of particular illustrative embodiments of first and second registers used to form addresses to elements within a table.

FIG. 3 is a diagram of particular illustrative embodiments of first and second registers used to form addresses to elements within a table. The diagram includes a first set 300 of first and second registers 302 and 304 to access a table of bytes. The diagram also includes a second set 310 of first and second registers 312 and 314 to access a table of halfwords. Additionally, the diagram includes a third set 320 of first and second registers 322 and 324 to access a table of words. Further, the diagram includes a fourth set 330 of first and second registers 332 and 334 to access a table of doublewords.

The first set 300 includes the first register 302, which includes a bit field including bit field data 306. The first register 302 may also include offset bits 307. The second register 304 includes a table address information portion 308 and an index portion 309. Using the extract-shift-add instruction (i.e., extract-shift-add instruction 216 illustrated in FIG. 2), the bit field data 306 from the first register 302 is written to the index portion 309 of the second register 304 to form an address to an element within a table that stores bytes of data. In this example, the insertion point 303 is at bit 0 of the second register 304.

The second set 310 includes the first register 312, which includes a bit field including bit field data 316. The first register 312 may also include offset bits 317. The second register 314 includes a table address information portion 318 and an index portion 319. Using the extract-shift-add instruction (i.e., extract-shift-add instruction 216 illustrated in FIG. 2), the bit field data 316 from the first register 312 is written to the index portion 319 of the second register 314 to form an address to an element within a table that stores halfwords of data. In this example, the insertion point 313 is at bit 1 of the second register 314.

The third set 320 includes the first register 322, which includes a bit field including bit field data 326. The first register 322 may also include offset bits 327. The second register 324 includes a table address information portion 328 and an index portion 329. Using the extract-shift-add instruction (i.e., extract-shift-add instruction 216 illustrated in FIG. 2), the bit field data 326 from the first register 322 is written to the index portion 329 of the second register 324 to form an address to an element within a table that stores words of data. In this example, the insertion point 323 is at bit 2 of the second register 324.

The fourth set 330 includes the first register 332, which includes a bit field including bit field data 336. The first register 332 may also include offset bits 337. The second register 334 includes a table address information portion 338 and an index portion 339. Using the extract-shift-add instruction (i.e., extract-shift-add instruction 216 illustrated in FIG. 2), the bit field data 336 from the first register 332 is written to the index portion 339 of the second register 334 to form an address to an element within a table that stores doublewords of data. In this example, the insertion point 333 is at bit 3 of the second register 334.

In assembly level programming syntax, the offset information may include extracted information that is used by the assembler to adjust the bit index values by an offset. In a particular example, for a table that stores bytes, no adjustment is necessary, so the insertion location 303 at bit zero may be used. For a table that stores half words, the assembler can encode the offset data as a 1-bit offset in the index portion 319 of the second register file 314, providing an insertion location 313 at bit 1 within the index portion 319. For a table that stores words, the assembler can encode the offset data 327 as a 2-bit offset in the unsigned immediate field of the second register file 324, providing an insertion location 323 at bit 2 within the index portion 329. For a table that stores double words, the assembler can encode the offset information 337 into a 3 bit offset in the unsigned immediate field of the second register 334, providing an insertion location 333 at bit 3 within the index portion 339.

In general, the second register files 304, 314, 324, and 334 (after insertion of the respective bit field data 306, 316, 326, and 336 of the respective first register files 302, 312, 322, and 332) contain an address to a table within the table portions 308, 318, 328 and 338 and an index to an element within the table within the index portions 309, 319, 329, and 339. The insertion locations 303, 313, 323, and 333 provide a bit offset which translates to a size of the data element within the table. By aligning the table to a logical boundary within the memory that is a power of two size equal to or greater than the table size, elements within the table may be accessed using the extract-shift-insert technique illustrated in FIG. 3.

In a particular embodiment, the data stored in the second register may be used as an unsigned immediate address to an element within a table in memory, such as the element 207 stored in the table 206 of the memory 202 illustrated in FIG. 2. This address may be utilized to write to the element within the table or to read data from the element.

Figure 4:
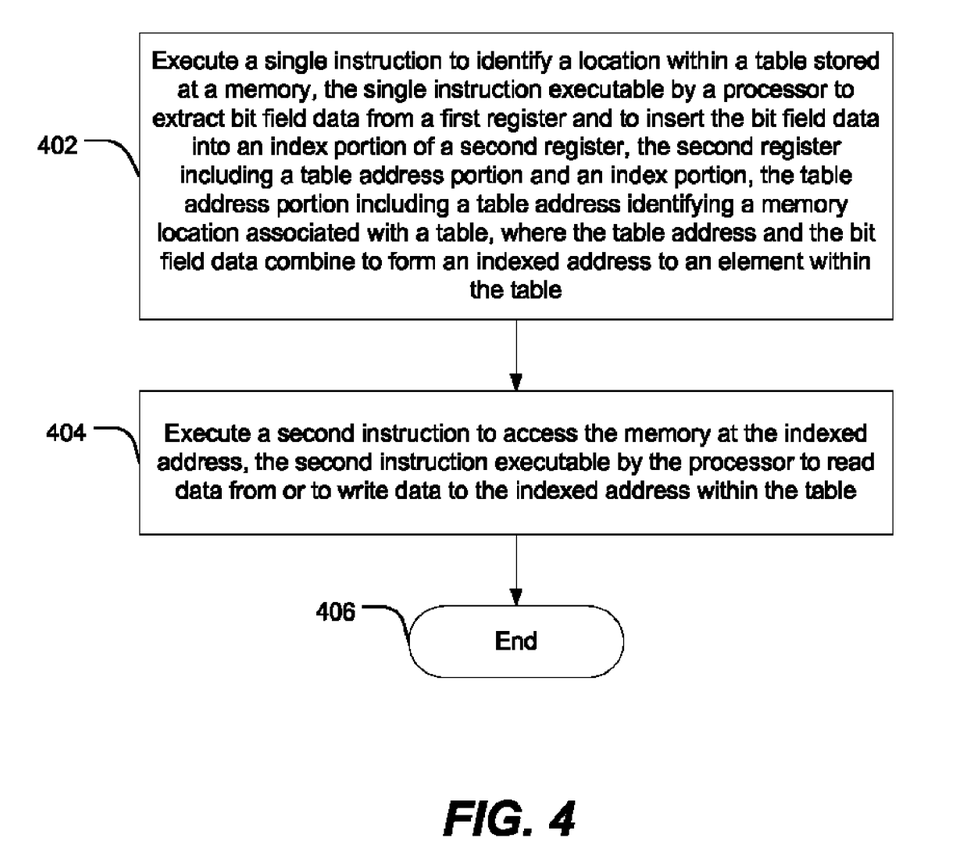
FIG. 4 is a flow chart of a particular illustrative embodiment of a method of determining an address of an element within a table.

FIG. 4 is a flow chart of a particular illustrative embodiment of a method of determining an address of an element within the table. At 402, the method includes executing a single instruction to identify a location within the table stored at a memory. The single instruction is executable by a processor to extract bit field data from a first register and to insert the bit field data into an index portion of the second register, where the second register includes a table address portion and the index portion. The table address portion includes a table address identifying a memory location associated with a table, where the table address and the bit field data combine to form an index address to an element within the table. Advancing to 404, the method includes executing a second instruction to access the memory at the indexed address. The second instruction is executable by the processor to read data from or to write data to the indexed address within the table. The method terminates at 406.

In a particular illustrative embodiment, the method may also include accessing the element within the table based the table address and the table index. In another particular embodiment, the bit field data is extracted and inserted into the second register in a single execution cycle. The first and second registers may be registers within a general register file, such as general registers of the general register file 126 illustrated in FIG. 1. In another particular embodiment, the extracted bit field data is inserted at an insertion point that is related to a data structure stored within the table. For example, the offset information, such as the offset information 307, 317, 327, and 337 illustrated in FIG. 3, may be utilized by one or more execution units to determine an insertion location (such as the insertion locations 303, 313, 323, and 333 illustrated in FIG. 3) for insertion of the extracted bit field data. In particular, the offset information may define an insertion point that varies according to whether the table stores bytes, halfwords, words, or doublewords. In particular, the offset information may define the type of data stored in the particular table. The execution units may utilize the location of the table in memory relative to a logical boundary and utilize the offset information to calculate an address to an element within the table and to retrieve the appropriate size data structure from the table.

Figure 5:
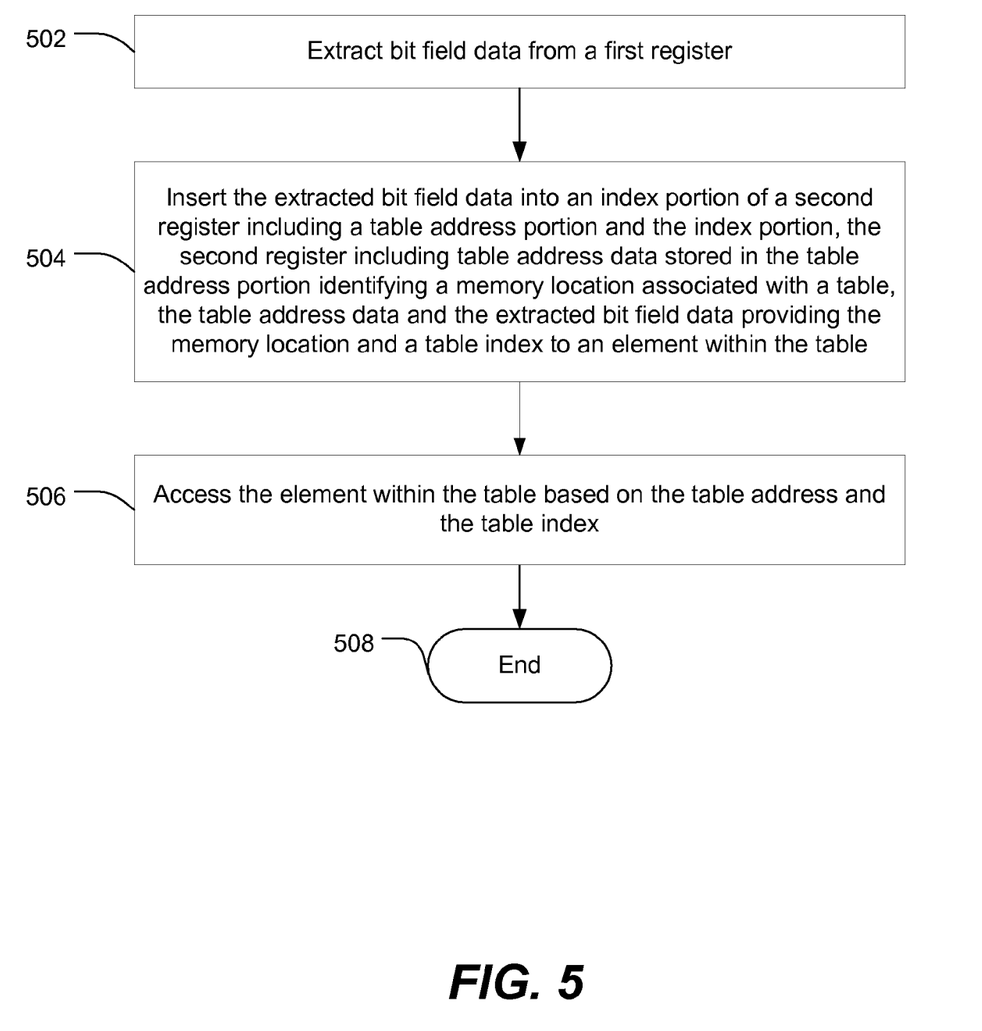
FIG. 5 is a flow chart of a second particular illustrative embodiment of a method of determining an address of an element within a table.

FIG. 5 is a flow chart of a second particular illustrative embodiment of a method of determining an address of an element within a table. At 502, the method includes extracting bit field data from a first register. Advancing to 504 the method includes inserting the extracted bit field data into an index portion of a second register that includes a table address portion and the index portion. The second register includes table address data stored in table address portion that identifies a memory location associated with a table. The table address data and the extracted bit field data define the memory location and a table index to an element within a table. Proceeding to 506, the method also includes accessing the element within the table based on the table address and the table index. The method terminates 508.

In a particular example, the extract-shift-add instruction described with respect to FIGS. 1-5 provides a very fast lookup into a table. In another particular embodiment, the extract-shift-add instruction may utilize a single shift and masking to provide vaccess to a particular element within the table.

Figure 6:
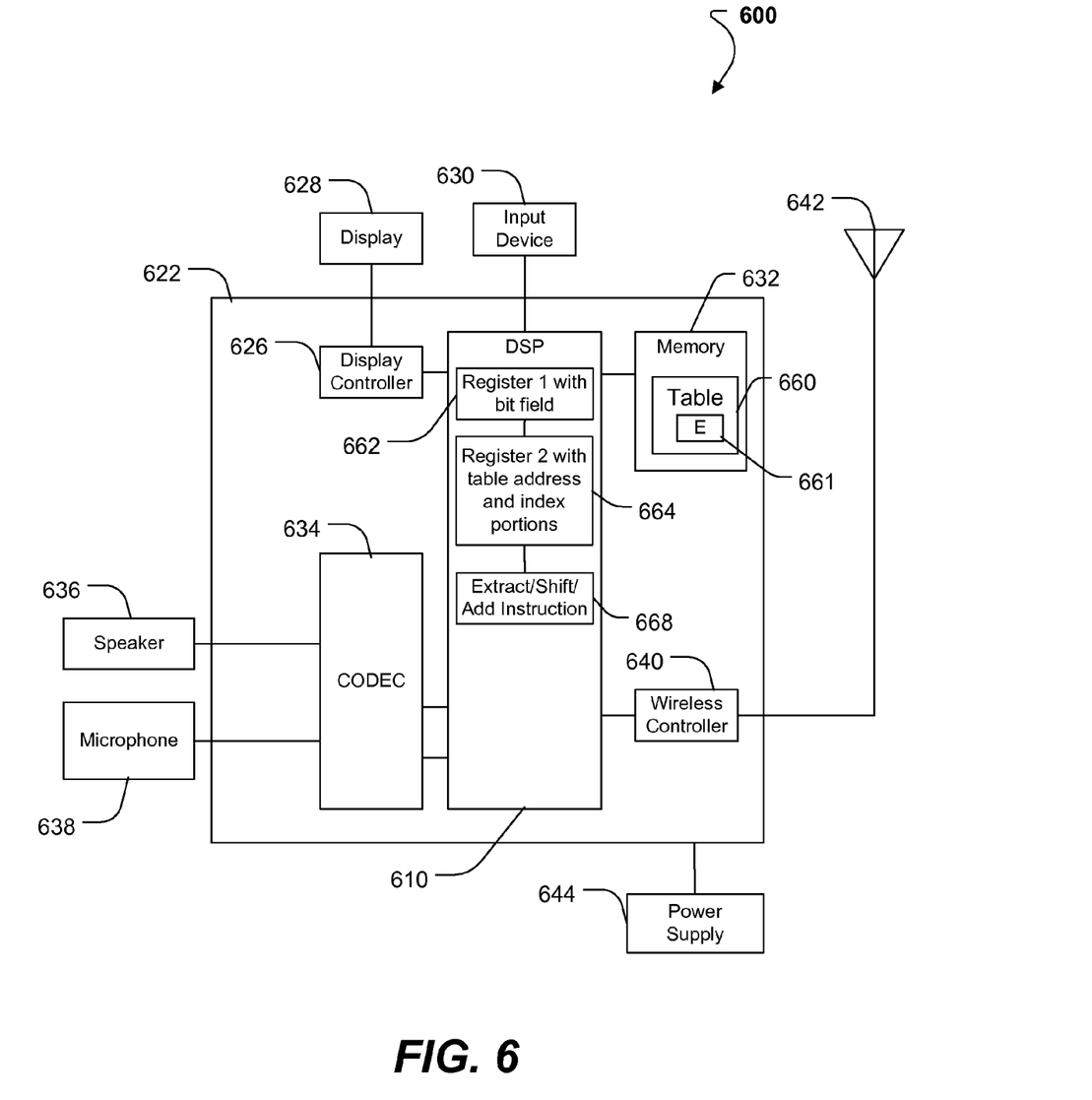
FIG. 6 is a block diagram of a representative wireless communication device including a processor to determine an address of an element within a table.

FIG. 6 is a block diagram of a representative wireless communication device 600 including a processor to determine an address of an element within a table. The portable communications device 600 can include a digital signal processor (DSP) 610 that includes a first register with bit field data 662, a second register with a table address portion and an index portion 664 and an extract-shift-add instruction 668 that is executable by an execution unit within the DSP 610 to perform an extract-shift-add operation as described with respect to FIGS. 1-5. The portable communications device 600 also includes a memory 632 that includes a table 660 including a table element 661. In a particular embodiment, an execution unit of the DSP 610 may execute the extract-shift-add instruction 668 to extract a bit field from the first register 662 and to insert the bit field into an index portion of the second register 664 to determine an address associated with the element 661 within the table 660. Data stored at the element 661 may be retrieved using the determined address, as described with respect to FIGS. 1-5.

FIG. 6 also shows a display controller 626 that is coupled to the digital signal processor 610 and to a display 628. Moreover, an input device 630 is coupled to the digital signal processor 610. Additionally, the memory 632 is coupled to the digital signal processor 610. A coder/decoder (CODEC) 634 can also be coupled to the digital signal processor 610. A speaker 636 and a microphone 638 can be coupled to the CODEC 634.

FIG. 6 also indicates that a wireless controller 640 can be coupled to the digital signal processor 610 and to a wireless antenna 642. In a particular embodiment, a power supply 644 is coupled to the on-chip system 622. Moreover, in a particular embodiment, as illustrated in FIG. 6, the display 628, the input device 630, the speaker 636, the microphone 638, the wireless antenna 642, and the power supply 644 are external to the on-chip system 622. However, each is coupled to a component of the on-chip system 622.

It should be understood that while the first register including the bit field 662 and the second register including a table address portion and an index portion 664 are depicted as separate components of the digital signal processor 610, both elements 662 and 664 may instead be integrated into a general register, such as the general register file 126 illustrated in FIG. 1. Additionally, while the first register including the bit field 662 and the second register including a table address portion and an index portion 664 are depicted within the DSP 610, it should be understood that other processing elements may also utilize the extract-shift-add instruction 668 with register data from two different registers to generate a table address and index to an element 661 within the table 660. For example, other components may include a processor adapted to execute an extract-shift-add instruction in a single clock cycle, including, for example, the display controller 626 (which may include a processor), the wireless controller 640 (which may include a processor), other processor circuits, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
executing a single instruction to identify a location of an element within a table, the table stored at a memory, the single instruction executable by a processor to:
extract bit field data from a first register;
insert the bit field data into an index portion of a second register, the second register including a table address; and
select an insertion point within the index portion based on a data type of the element stored in the table, wherein the table is configured to store entries of multiple data types;
wherein the table address and the bit field data combine to form an indexed address to the element within the table.

2. The method of claim 1, further comprising executing a second instruction to access the memory at the indexed address, the second instruction executable by the processor to read data from or to write data to the indexed address within the table.

3. The method of claim 1, wherein the table is aligned to a memory boundary that is a power-of-two size greater than or equal to a size of the table.

4. The method of claim 3, wherein the table comprises a four kilobyte table and wherein the table is aligned to a four kilobyte boundary of the memory.

5. The method of claim 1, wherein the data type of the element stored in the table is a byte, a halfword, a word, or a double word.

6. The method of claim 1, further comprising:
determining a first bit offset that corresponds to a first data type of the element stored in the table; and
shifting the extracted bit field data based on the first bit offset.

7. The method of claim 6, further comprising:
determining a second bit offset that corresponds to a second data type of a second element stored in the table, wherein the second bit offset is different that the first bit offset and the second data type is different than the first data type; and
shifting the extracted bit field data based on the second bit offset.

8. The method of claim 6, wherein the insertion point is based on the first bit offset.

9. A processor comprising:
a first register including a bit field;
a second register including a table address portion and an index portion, the table address portion including a table address of a table stored at a memory, wherein the table is configured to store entries of different data types; and
an execution unit adapted to select an insertion point in the index portion based on a data type of an element within the table, wherein the insertion point is different for each data type, and wherein the execution unit is adapted to generate an address by processing a single instruction to extract bit field data from the bit field of the first register and to insert the extracted bit field data, at the insertion point, into the index portion of the second register to generate an indexed address to the element within the table.

10. The processor of claim 9, wherein the table address portion comprises a most significant bit portion of the second register.

11. The processor of claim 9, wherein the execution unit includes a shifter to shift bits.

12. The processor of claim 11, wherein the shifter is adapted to shift the extracted bit field data by a pre-determined number of bits and wherein shifted bit field data is inserted into the index portion using an add operation.

13. The processor of claim 11, wherein the shifter comprises a bi-directional shifter.

14. The processor of claim 9, wherein the table is aligned to a memory boundary that is a power-of-two greater than or equal to a size of the table.

15. The processor of claim 9, wherein the extracted bit field data is inserted into a least significant bit portion of the second register.

16. The processor of claim 15, wherein the extracted bit field data is inserted at the insertion point within the least significant bit portion indicating the type of data stored in the table.

17. The processor of claim 16, wherein the insertion point is encoded by an assembler at compile time.

18. A method of determining an address of an element within a table that is configured to store multiple data types, the method comprising:
extracting bit field data from a first register;
determining a bit offset in an index portion of a second register, wherein the bit offset is based on a data type of the element within the table and the bit offset is different for each data type; and
inserting the extracted bit field data into the index portion of the second register based on the bit offset, wherein the second register includes table address data, wherein the table address data and the extracted bit field data provide an indexed address to the element within the table.

19. The method of claim 18, wherein the multiple data types comprise a byte, a halfword, a word, and a double word.

20. The method of claim 18, further comprising accessing the element within the table based on the indexed address.

21. The method of claim 18, wherein extracting the bit field data and inserting the extracted bit field data are performed in response to execution by a processor of a single instruction.

22. The method of claim 18, wherein extracting the bit field data and inserting the extracted bit field data are performed within a single execution cycle.

23. The method of claim 18, wherein the first register and the second register are registers within a general register file.

* * * * *